(12) United States Patent
Lieber et al.

(10) Patent No.: US 6,629,010 B2
(45) Date of Patent: Sep. 30, 2003

(54) CONTROL FEEDBACK SYSTEM AND METHOD FOR BULK MATERIAL INDUSTRIAL PROCESSES USING AUTOMATED OBJECT OR PARTICLE ANALYSIS

(75) Inventors: Kenneth John Lieber, Goonengerry (AU); Ian B. Browne, Point Cartwright (AU)

(73) Assignee: Advanced Vision Particle Measurement, Inc., Sacramento, CA (US)

( * ) Notice: Subject to any disclaimer, the term of this patent is extended or adjusted under 35 U.S.C. 154(b) by 337 days.

(21) Appl. No.: 09/860,866

(22) Filed: May 18, 2001

(65) Prior Publication Data

US 2002/0170367 A1 Nov. 21, 2002

(51) Int. Cl.$^7$ .......................... G06F 19/00; G01D 21/00
(52) U.S. Cl. ....................... 700/109; 700/28; 73/865.5; 73/865.8
(58) Field of Search ............................. 700/14, 32, 109, 700/110, 265, 28, 49–51, 275; 73/865.5, 865.8; 382/109, 266; 356/335; 702/29, 82, 27, 128; 241/34

(56) References Cited

U.S. PATENT DOCUMENTS

| | | |
|---|---|---|
| 3,097,744 A | 7/1963 | Hutter et al. |
| 3,357,557 A | 12/1967 | Austin |
| 3,545,610 A | 12/1970 | Kelly et al. |
| 3,901,388 A | 8/1975 | Kelly |
| 3,977,526 A | 8/1976 | Gordon et al. |
| 4,057,146 A | 11/1977 | Castaneda et al. |
| 4,122,952 A | 10/1978 | Richards |
| 4,205,384 A * | 5/1980 | Merz et al. .................... 702/29 |
| 4,236,640 A | 12/1980 | Knight |
| 4,295,200 A * | 10/1981 | Johnson ........................ 702/82 |
| 4,322,288 A | 3/1982 | Schmidt |

(List continued on next page.)

FOREIGN PATENT DOCUMENTS

| | | |
|---|---|---|
| DE | 41 19 240 A1 | 6/1991 |
| EP | 0 518 188 A2 | 6/1992 |
| JP | 10-15426 * | 1/1998 |
| WO | WO 97/14950 | 10/1996 |

OTHER PUBLICATIONS

Browne, Craig, et al., Comparison Tests of Automated Equipment For Analyzing Aggregate Gradation; ICAR 2001; pp. 1–16.

Browne, Ian, et al.; On–line particle size analysis of bulk materials for the steel industry; Steel Times; Nov. 1997; pp. 442 and 444.

(List continued on next page.)

Primary Examiner—Leo Picard
Assistant Examiner—Steven R. Garland
(74) Attorney, Agent, or Firm—Blakely, Sokoloff, Taylor & Zafman LLP

(57) ABSTRACT

A control feedback system and method for industrial processes using automated particle or object analysis is disclosed. The control feedback system and method includes a particle characteristic measuring unit to obtain measured characteristics of a bulk material sample; an optimal characteristic definition for comparison with the measured characteristics; a corrective action database for defining and selecting actions to be taken in response to a comparison of the measured characteristics with the optimal characteristic definition; and a control line network to transfer control signals to a plurality of processing units in response to a selected action to be taken.

20 Claims, 6 Drawing Sheets

U.S. PATENT DOCUMENTS

| | | |
|---|---|---|
| 4,348,277 A | 9/1982 | Cowlin et al. |
| 4,624,367 A | 11/1986 | Shafer et al. |
| 4,735,323 A | 4/1988 | Okada et al. |
| 5,011,285 A * | 4/1991 | Jorgensen et al. .......... 356/335 |
| 5,060,290 A | 10/1991 | Kelly et al. |
| 5,134,278 A | 7/1992 | Nelen |
| 5,157,976 A * | 10/1992 | Tokoyama et al. ......... 73/865.8 |
| 5,303,310 A * | 4/1994 | Grove ........................ 382/109 |
| 5,309,215 A | 5/1994 | Schumann .................. 356/335 |
| 5,442,716 A | 8/1995 | Otsu et al. |
| 5,471,311 A | 11/1995 | van den Bergh et al. |
| 5,519,793 A | 5/1996 | Grannes |
| 5,598,262 A | 1/1997 | Jutard et al. |
| 5,675,419 A | 10/1997 | Van Den Bergh et al. |
| 5,733,592 A | 3/1998 | Wettstein et al. |
| 5,911,001 A | 6/1999 | Kawada |
| 5,917,926 A | 6/1999 | Leverett |
| 5,960,098 A | 9/1999 | Tao |
| 5,969,810 A | 10/1999 | Nicks et al. |
| 5,988,645 A | 11/1999 | Downing |
| 6,049,379 A | 4/2000 | Lucas |
| 6,061,125 A | 5/2000 | Thomas et al. |
| 6,067,155 A | 5/2000 | Ringlien |
| 6,112,588 A | 9/2000 | Cavallaro et al. |
| 6,112,903 A | 9/2000 | Kimmel et al. |
| 6,535,769 B1 * | 3/2003 | Konar ........................ 700/14 |

OTHER PUBLICATIONS

Browne, Ian, et al.; Online measurement of particle size; Bulk Handling International; Mar./Apr. 2000; pp. 26–27.

Bourke, Tm, et al.; Non–Contact Measurement of Particulate Material Parameters Including Size and Shape; Australian Journal Of Mining; Feb. 1997; pp. 54–56.

Dumitru, Ion, et al.; Measurement of minus three mm particles; Quarry; Oct. 2000; pp. 42,44 and 46.

* cited by examiner

CONTROL FEEDBACK SYSTEM AND METHOD FOR BULK MATERIAL INDUSTRIAL PROCESSES USING AUTOMATED OBJECT OR PARTICLE ANALYSIS

FIELD OF THE INVENTION

The present invention relates to industrial processes wherein streams of irregularly shaped objects or particles of bulk materials are processed from a raw state into a finished product state or simply transferred along a conveyor belt. In particular, the present invention relates to industrial processes using automated object or particle analysis as part of the industrial process.

BACKGROUND OF THE INVENTION

Various conventional industrial processes are used for the manufacture or refinement of various products and materials. For example, the aggregate industry uses industrial processes to convert raw quarry materials into finished products such as gravel, crushed rock, asphalt, or concrete materials. Typically, these conventional industrial processes involve conveyors, which transfer raw material through various processing stations as part of an industrial system. Each station performs various refinements to the materials moving through the system on the conveyor. Conventional industrial systems use various techniques for monitoring the particle size of bulk materials traveling through the system on a conveyor or the like.

One typical prior art method for providing size distribution measurements of bulk material moving on a conveyor involves using an automated or manual sampling procedure. This prior art method involves analyzing a physical sample of the conveyed raw material in a laboratory setting where screen sieve analysis is used to determine the size of particles in the material sample. In addition, there are a number of conventional techniques for physically characterizing the size and shape or reflectance of materials traveling on a conveyor in an industrial process. These conventional techniques, which are used primarily for sorting operations, employ a variety of different techniques. For example, U.S. Pat. No. 3,357,557 discloses a technique for using reflected light as a means of determining the flatness of semiconductor chips. In U.S. Pat. No. 4,057,146, beans, grain, and similar produce are sorted by size and color analysis as a result of light being reflected from the produce. Similarly, various types of ores have been sorted as a function of light reflectance. In this regard, U.S. Pat. Nos. 3,097,744; 3,901,388; and U.S. Pat. No. 3,977,526 are representative examples. In addition, other conventional ore sorters use lasers as a light source such as the system disclosed in U.S. Pat. No. 3,545,610 and U.S. Pat. No. 4,122,952. Other conventional ore sorters use infrared light as the light source such as U.S. Pat. No. 4,236,640.

Various conventional automated particle analysis systems are commercially available for rapidly determining the grain size distribution of unbound aggregates. These conventional systems provide a faster alternative to standard sieve analysis. These conventional machines capture and analyze digital images of the aggregate particles on a conveyor stream to determine size gradation. Such conventional particle analysis systems include, for example, the VDG-40 Video Grader developed by Emaco, Ltd. of Canada; the Computer Particle Analyzer (CPA) developed by W. F. Tyler and Terry Reckart; the OptiSizer, PFDA5400 by Micromeritics Instrument Corp.; Video Imaging System (VIS), by John B. Long Company; Particle Size Distribution Analyzer (PSDA), by Buffalo Wire Works Company; and the Particle Parameter Measurement System (PPMS), by Scientific Industrial Automation Pty. Limited.

Each of these material analysis systems uses various techniques to obtain information about objects or materials being processed in an industrial system. However, the conventional systems have been unable to use this information to monitor and control the operation of the overall industrial process. Because the conventional material analysis systems have typically been added on to existing industrial systems, there has not been any focus placed on the use of the information gathered by these systems for monitoring or controlling the industrial process as a whole.

Thus, a control feedback system and method for industrial processes using automated particle or object analysis is needed.

SUMMARY OF THE INVENTION

A control feedback system and method for industrial processes using automated particle or object analysis is disclosed. The control feedback system and method includes a particle characteristic measuring unit to obtain measured characteristics of a sample; an optimal characteristic definition for comparison with the measured characteristics; a corrective action database for defining and selecting actions to be taken in response to a comparison of the measured characteristics with the optimal characteristic definition; and a control line network to transfer control signals to a plurality of processing units in response to a selected action to be taken.

DETAILED DESCRIPTION OF THE PREFERRED EMBODIMENTS

The present invention is a control feedback system and method for industrial processes using automated particle or object analysis. In the following detailed description, numerous specific details are set forth in order to provide a thorough understanding of the present invention. However, it will be apparent to one of ordinary skill in the art that these specific details need not be used to practice the present invention. In other circumstances, well-known structures, materials, circuits, processes, and interfaces have not been shown or described in detail in order not to unnecessarily obscure the present invention.

Figure 1:
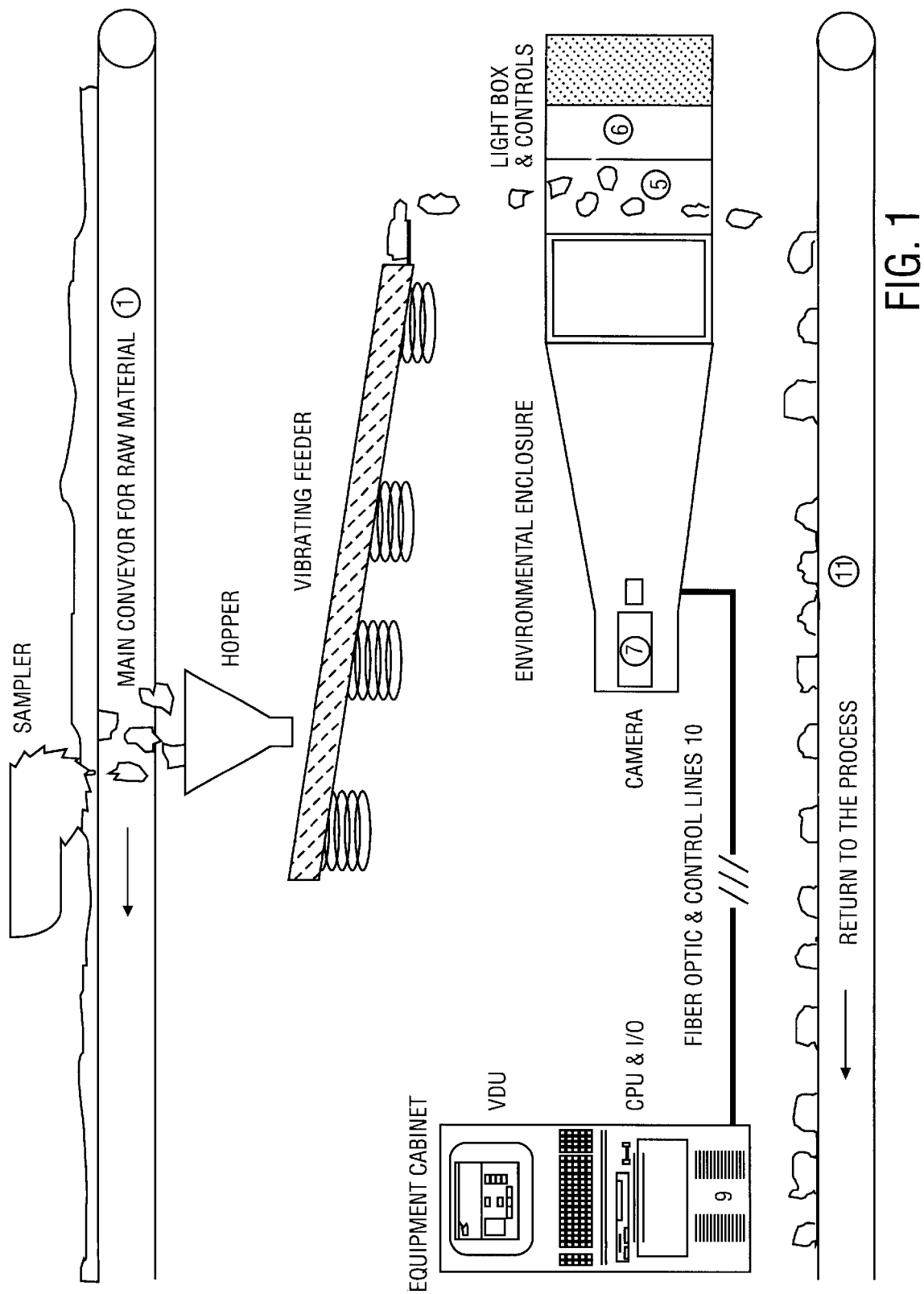
FIG. 1 illustrates a design for a particle parameter measurement system.

Referring now to FIG. 1, one example of a conventional automatic particle measurement system is illustrated. In the arrangement shown in FIG. 1, a main conveyor 1 is shown carrying particulate material. A primary sampling device 2 is provided to divert a pre-selected amount of the particulate material from the main conveyor 1 into a hopper 3. For best results, the pre-selected sample must be a truly representative sample and not unevenly distributed or misrepresentative of the raw material. Normally, this is done by taking a complete cross-section of the material on the conveyor belt using a cross-belt sampler or taking a complete sample from the end of the belt. The material is withdrawn from the hopper by a vibrating feeder 4. It will be apparent to those of ordinary skill in the art that some other conventional device could separate the particles into an approximate monolayer and keep particle overlap to a minimum. The vibrating feeder 4 is a conventional design with an adjustable vibration rate and/or vibration amplitude and/or inclination to provide for a varying rate of throughput or speed. Alternatively, vibrating feeder 4 can be comprised of a plurality of separate individual vibrating feeders each of which can be used to vary the distribution and rate of material dropping off the end of the vibrating feeder 4. It will be apparent to those of ordinary skill in the art that some other conventional device could separate the particles into an approximate monolayer and keep particle overlap to a minimum. The vibrating feeder 4 is adjusted to optimally distribute particulate material so that it discharges off the end of vibrating feeder 4 in an approximate monolayer. A camera imaging region or measurement window 5 is provided and has backlighting provided by a light box 6.

In the arrangement shown in FIG. 1, the light box 6 and camera 7 are surrounded by environmental enclosure 8 to protect the arrangement from environmental dust and to exclude extraneous external light from entering the environment. The environmental housing is protected from ingress of dust by either positive pressure or by suction. Additionally, pneumatic wipers (not shown) can be provided to clean the surface of backlight 6 and the camera window 7.

In operation, the arrangement illustrated in FIG. 1 causes a sample of particulate material to drop off the end of vibrating feeder 4 into the camera-imaging region 5 and subsequently onto conveyor 11, which returns the sample to the industrial process. As the sample particulate matter drops through camera imaging region 5, light box 6 illuminates the particles in the sample for imaging by camera 7. In an improvement to the structure shown in FIG. 1, the present invention includes built-in protection to eliminate counting particles more than once as they fall through the camera-imaging region 5. This is done by putting in a minimum time between images based on height of the vibrating feeder 4 above imaging region 5 and the bottom of the image taken within the image region 5. Clearly, this minimum time is dependent on gravitational acceleration. As particles or objects of the sample fall through camera imaging region 5, camera 7 captures static images of the falling particles. Using processing logic embodied within processor 9 and coupled via control lines 10, the system of FIG. 1 can compute various characteristics, such as size and shape, from the images captured by camera 7. In one embodiment of the system illustrated in FIG. 1, the connection 10 between the enclosure 8 and processing system 9 is by way of an optical fiber link. This link allows communication over distances of up to 2 kilometers and overcomes difficulties associated with electrical interference. This arrangement also eliminates earth loops and different earth potential influences on the video signal. The software associated with processing system 9 is able to detect any overlapping particles and reject them for the purposes of the measurement and size distribution. Camera 7 is typically a CCD (charge coupled device) camera using an electronic shutter controlled by a computer to freeze the image and transfer the image to a frame buffer associated with processing system 9.

Figure 2:
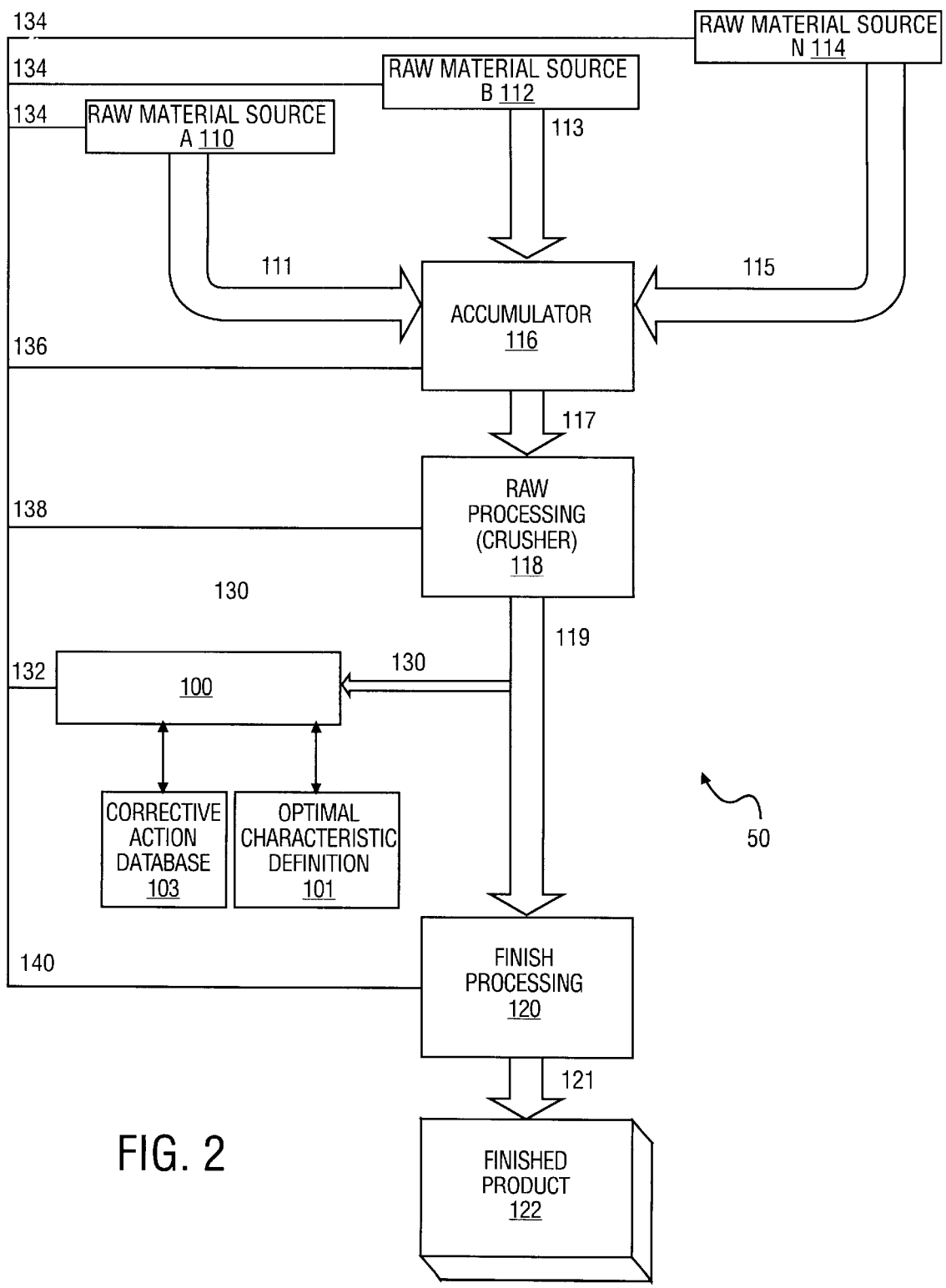
FIG. 2 illustrates a block diagram of an industrial process system using the present invention.
Figure 6:
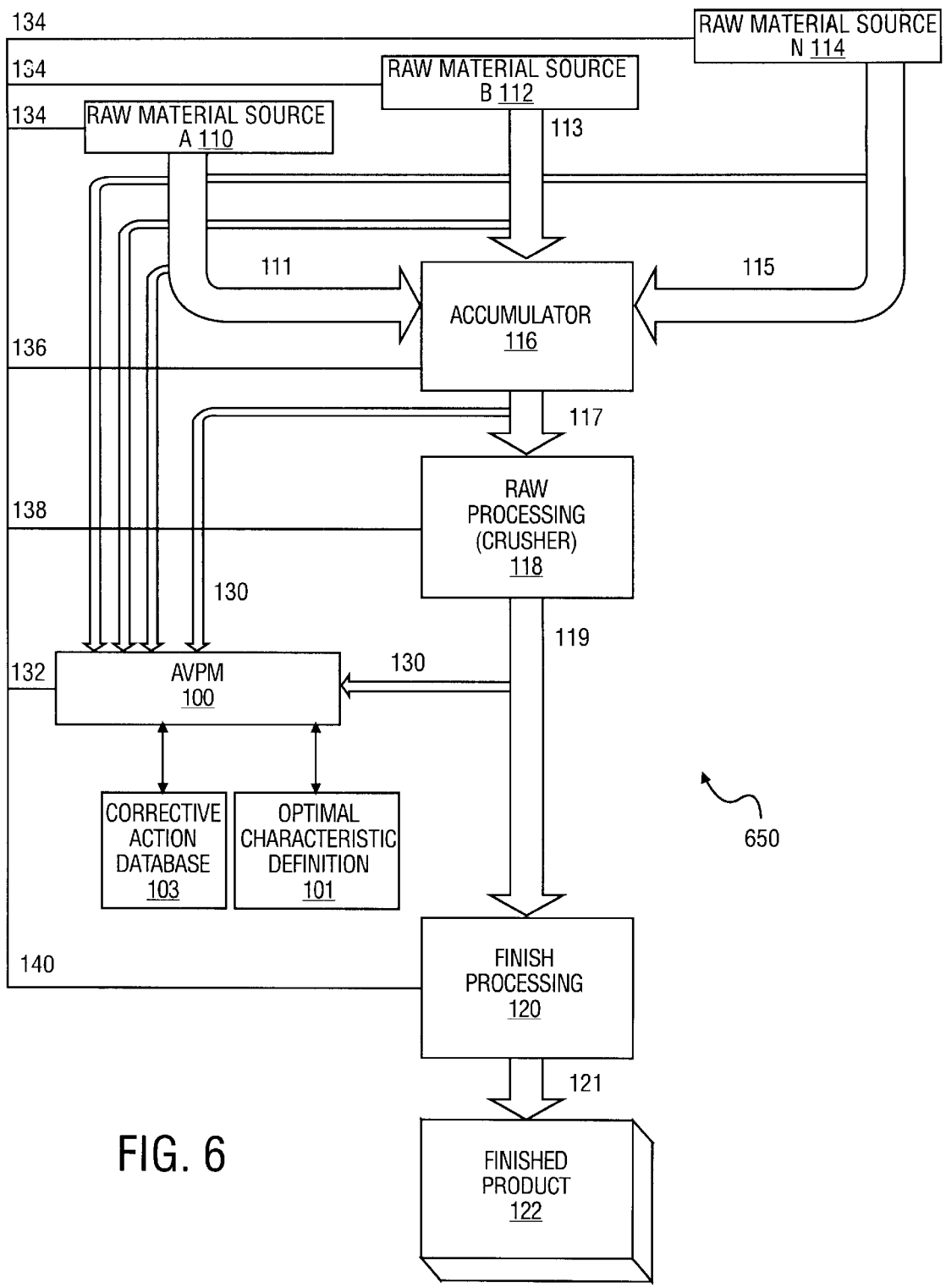
FIG. 6 illustrates a block diagram of an alternative embodiment of the industrial process system using the present invention.

Referring now to FIG. 2, a block diagram illustrates one embodiment of an industrial process system of the present invention. FIG. 2 illustrates an improved particle measurement system denoted the advanced vision particle measurement system (AVPM) 100, a simplified embodiment of which was illustrated in FIG. 1 and described above, in the context of an overall industrial system 50. In general, AVPM 100 monitors various characteristics of objects and/or materials being transported on conveyor 119. In various other alternative embodiments of the present invention, the AVPM could also monitor conveyors 111, 113, 115 and 117 (See FIG. 6). This arrangement would enable monitoring of the raw materials and the performance of the raw processing unit 118. In one embodiment of the present invention, AVPM 100 monitors characteristics including the size, shape, and computed volume and weight of objects or materials on conveyor 119. In a memory or data storage area of processor 9 of AVPM 100, a set of information 101 describing a desired or optimal set of object or material characteristics on conveyor 119 is stored. This optimal characteristic data set 101 can be a user-entered profile or automatically generated profile of desired or optimal characteristics of objects or materials on conveyor 119. In this manner, the optimal characteristic definition 101 is provided to and maintained by processor 9 of AVPM 100. In operation as described above, AVPM 100 periodically takes samples from the objects or materials traveling on conveyor 119. These samples are analyzed as described above to obtain measurements for each of the prescribed characteristics of the objects or materials on conveyor 119. After each sample is obtained and the corresponding characteristics of the sample are measured, the measured sample characteristics are compared with the optimal characteristic definition 101. As a result of this comparison, it may be determined that the characteristics of the measured sample deviate from the characteristics defined by the optimal characteristic definition 101. Once this characteristic deviation is found, processor 9 can use rules based logic or a corrective action database 103 to determine an action to take to reduce the deviation found between the characteristics of a measured sample and the characteristics defined in the optimal characteristic definition 101. Depending upon the particular characteristic found to be deviating from the optimal definition, various corrective actions may be predefined in the rules based logic or corrective action database 103. For example, the AVPM 100 may have determined that the average size of a measured sample taken from objects or materials on conveyor 119 may be larger than the average size defined in the optimal characteristic definition 101. As a result of this size deviation, processor 9 will determine that the average size of subsequent measured samples must be reduced. Processor 9 in AVPM 100 accesses corrective action database 103 to obtain an appropriate corrective action to take to reduce the average size of subsequent measured samples. This corrective action database 103 contains predefined sets of corrective actions necessary to handle various deviations of the measurements of characteristics of measured samples as compared with the optimal characteristic definition 101. In the example set forth above related to the size of the measured sample, the corrective action database 103 may define a corrective action for reducing the average size of subsequent measured samples to be configuring raw processing unit 118 to crush raw material to a finer granularity or causing raw processing unit 118 to process raw material for a longer period of time thereby producing smaller size material. Either of these corrective actions or other corrective actions defined in corrective action database 103 may be obtained by processor 9 in response to finding a deviation between a measured sample and the optimal characteristic definition 101. In this manner, AVPM 100 measures characteristics of samples obtained from objects or materials on conveyor 119 and determines corrective actions necessary to reduce the deviation of the measured characteristics of the samples as compared with the optimal characteristic definition 101.

The corrective actions defined in corrective action database 103 can be numerous depending upon the characteristics being measured by AVPM 100 and the various processing units available in a particular industrial system, such as the sample industrial system 50 shown in FIG. 2. Once AVPM 100 determines which corrective action is necessary to cause a measured sample to conform to the optimal characteristic definition 101, AVPM 100 generates various signals on a control line network including line 132, illustrated in FIG. 2, to configure and control other units within the industrial system 50 for the purpose of causing the characteristics of the measured sample on conveyor 119 to conform with the optimal characteristic definition 101. In one embodiment of the system illustrated in FIG. 2, the control line network including line 132 between the AVPM 100 and other processing units within the industrial system 50 is by way of an optical fiber link. This link allows communication over distances of up to 2 kilometers and overcomes difficulties associated with electrical and environmental interference. This arrangement also eliminates earth loops and different earth potential influences on the control signals.

Again referring to the example set forth above related to a deviation in the average size of a measured sample, AVPM 100, after accessing corrective action database 103, determines that raw processing unit 118 must be configured to reduce the mean size of the material it is processing. Thus, AVPM 100 generates a signal on line 132 of the control line network which is transmitted to raw processing unit 118 via line 138 of the control line network, as shown in FIG. 2, to request raw processing unit 118 to produce smaller material output on conveyor 119. Depending upon the particular conventional raw processing unit 118 available in a particular industrial process, AVPM 100, via a signal on line 132, may program raw processing unit 118 to either process the raw material for a greater length of time thereby reducing the average size of material output on conveyor 119 or alternatively raw processing unit 118 can be programmed by AVPM 100 to change various control dimensions within the crusher to produce smaller size output.

In the alternative, AVPM 100 can also take other corrective actions as predefined in corrective action database 103 to conform measured characteristics of material on conveyor 119 to optimal characteristic definition 101. For example, as shown in FIG. 2, there may be a plurality of raw material sources, such as raw material source A 110, raw material source B 112, or raw material source N 114. It will be apparent to one of ordinary skill in the art that any number of raw material sources can be provided in a particular industrial process. In the example illustrated in FIG. 2, each of the raw material sources 110–114 provide their output to accumulator 116. Accumulator 116 is used to combine the output from a plurality of raw material sources. As will be understood by those of ordinary skill in the art, the raw material sources 110–114 may be loaded initially with raw materials having various known characteristics. For example, raw material source A 110 can be initially loaded with a type of material having a relatively small average size. Raw material source B 112 could be initially loaded with a type of material having an average relative size slightly larger than the size of material loaded in raw material source A 110. Similarly, raw material source N 114 can be initially loaded with material having an average relative size slightly larger than both raw material source A 110 and raw material source B 112. In this manner, a range of relative sizes of raw material can be spread over a number of independent raw material sources 110–114. Having thus produced raw material sources covering a range of raw material size characteristics, AVPM 100 can control the size characteristics of raw material measured on conveyor 119 by controlling the level of output being provided by each of the raw material sources 110–114. For example, again referring to the example set forth above related to the average size of material on conveyor 119, AVPM 100 can take an alternative corrective action as defined in the corrective action database 103 to cause the characteristics of the measured sample to conform to the optimal characteristic definition 101. In this example, AVPM 100 sends a signal on line 132 to control the output of each of the plurality of raw material sources 110–114 on line 134 of the control line network. In this manner, AVPM 100 can adjust the output provided by each of the raw material sources 110–114 to adjust the characteristics of the raw material to a desired characteristic level provided within the range of characteristics available across each of the raw material sources 110–114. For example, if the measured sample on conveyor on 119 is determined to be larger in average size than the desired optimal characteristic definition 101, AVPM 100 sends a signal on line 132 to raw material source 110 on line 134 to cause raw material source A 110 to increase its output of small raw material provided to accumulator 116 on conveyor 111. Similarly, AVPM 100 also sends a control signal to raw material source N 114 on line 134 causing raw material source N 114 to decrease its output of large raw material on conveyor 115 to accumulator 116. In this manner, the average size of raw material collected by accumulator 116 from each of the available raw material sources 110–114 will be a smaller average size. Thus, the smaller average size raw material collected by accumulator 116 will be transferred to raw processing unit 118 via conveyor 117. Because the average size of raw material provided to raw processing unit 116 will be initially smaller, the output of raw material from raw processing unit 118 on conveyor 119 will be smaller still. Thus, over a period of time, the average size of raw material measured on conveyor 119 will be brought into conformity with the desired size defined by the optimal characteristic definition 101. Again, in reference to the various alternative embodiments disclosed above, the AVPM 100 can also be coupled to conveyors 111, 113, 115, and 117 (See FIG. 6). Using the techniques described above, the AVPM 100 can monitor the characteristics of material on conveyors 111, 113, 115, and 117 to obtain information on size distribution and the other parameters of each type of raw material. This could be useful in determining the contribution of each type of raw material in the overlapping size ranges. It may also be useful to have the benefit of this analysis if different kinds of raw material are being fed to the accumulator 116. Coupling AVPM 100 to conveyor 117, for example, would allow the true input to the raw processing unit 118 to be monitored.

Using a similar technique, AVPM 100 can also produce corrective actions and control signals on line 132 for the purpose of controlling a variety of characteristics of objects or materials measured on conveyor 119. In various embodiments of the present invention, AVPM 100 can monitor and control various characteristics of objects or materials being processed in industrial system 50. These characteristics monitored and controlled by AVPM 100 could include the size, shape, volume, weight, density, temperature, moisture content, texture, reflectivity, color, opacity, and chemical composition of materials transferred on conveyor 119. AVPM 100 also retains a predefined optimal characteristic definition 101 for each of the characteristics enumerated above. As such, a predefined profile of a desired optimal set of output material characteristics can be defined in the optimal characteristic definition 101. Using the embodiment of the AVPM 100 illustrated in FIG. 1 and described above, material characteristics such as size, shape, volume, density and weight can be measured. Using the images of a measured sample captured by camera 7 and processed by processor 9, the size and shape of particles within a measured sample can be determined. The volume of each of the particles of a measured sample and thus the average volume for the sample can be inferred from the size and shape determined from the sample images. In one embodiment of the present invention, volume of particles in a particular sample is based on the minimum and maximum radii of the best fit ellipse of the 2-dimensional projected image of the particle as illuminated by back light 6 onto camera 7 via the camera lens. In one embodiment of the present invention, the formula for determining the volume is provided as $4/3 a^2 b \pi F$, where a is the minimum ellipse radius, b is the maximum ellipse radius and F is a compensation correction based on shape and other known variables that influence the results. To determine the size distribution (as represented by weight percent) in a similar manner as done manually, where a mechanical set of sieves have the material vibrated through them from coarse to fine. Manually the material retained on each sieve is weighed and the weight percentage on each sieve is then calculated. In the AVPM the weight percent is calculated from the volumes measured. The area value for each particle is compared to preset equivalent sieve sizes area in the AVPM. Where the equivalent sieve size square openings areas are determined by $\pi r^2$. Where r is half the distance between the sides of the sieve openings. When the particle area is less than the sieve area above and greater than the next smaller sieve determines which sieve will retain the particle. Each equivalent sieve size has an accumulator. The particle volume is then added to this accumulator. The weight percent for each equivalent sieve size can then be calculated from the volume on the equivalent sieve and the total volumes of all the equivalent sieve sizes. The weight of a measured sample can be determined per measured particle as inferred from the volume of particular particles, the known type of material, and/or the known material density after excluding overlapping portions of the particle images captured by camera 7. Thus, weight can be estimated using the predetermined volume in combination with a material density. Given the weight per measured particle, the average weight of a particular sample can also be determined. These measured characteristics of a material sample can be used as described above to cause various corrective actions in the industrial process to conform to the measured characteristics to the desired optimal set of characteristics. Using an improved AVPM system as described below, additional characteristics including temperature and moisture, texture, reflectivity, color, and opacity, and chemical composition can be monitored and used as control inputs for an industrial process.

Figure 3:
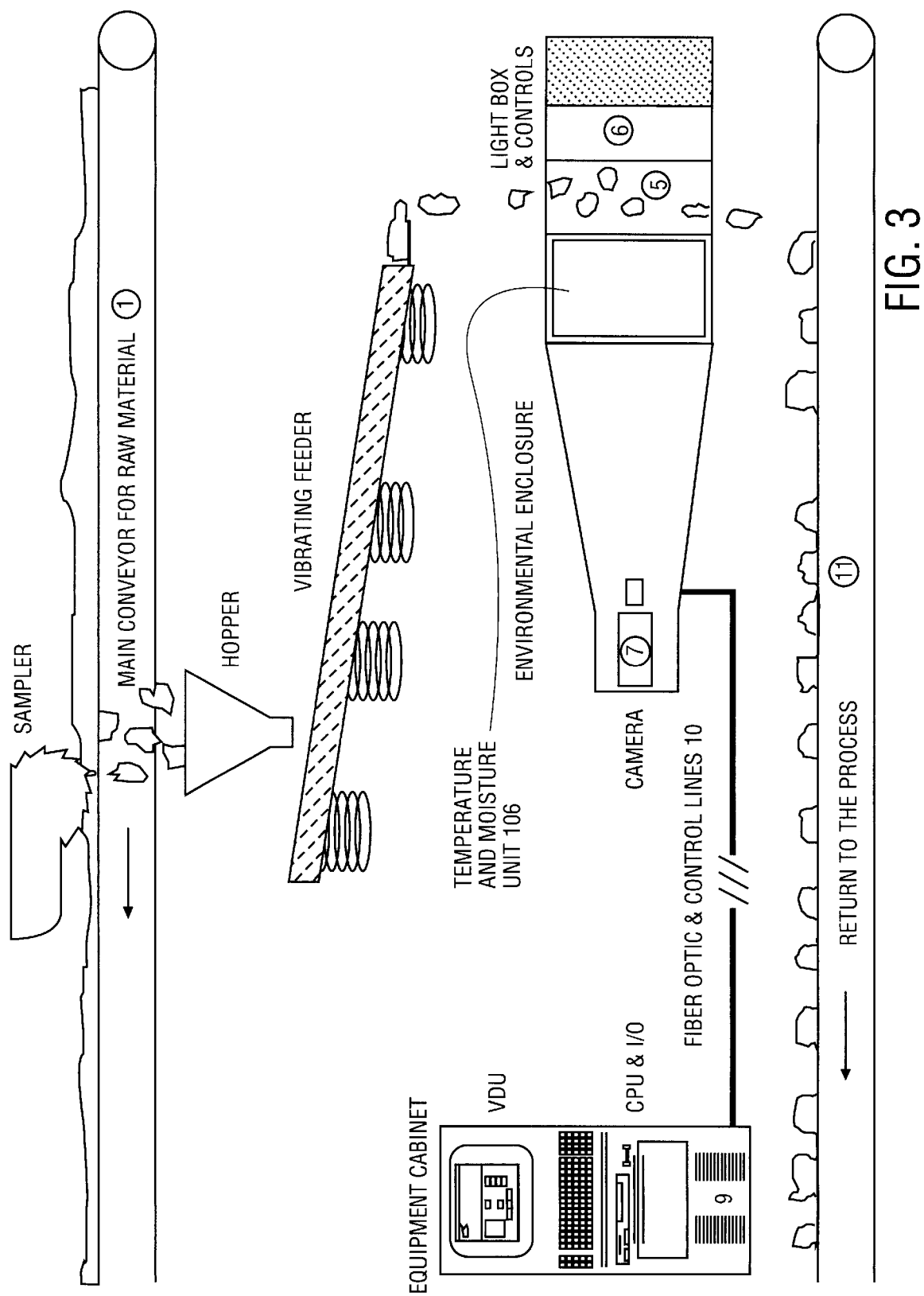
FIG. 3 illustrates an improved design for a particle parameter measurement system wherein temperature and moisture are measured.

The present invention also measures temperature and moisture of objects or materials traveling through industrial process 50. Referring to FIG. 3, an improved AVPM 100 system including temperature and moisture unit 106 is illustrated. Temperature and moisture unit 106 is used to measure the temperature and moisture content characteristics of a sample dropping through region 5. In one embodiment of the present invention, temperature and moisture unit 106 includes infrared detectors for receiving temperature information of sample particles passing through region 5. It will be apparent to one of ordinary skill in the art that these infrared detectors are appropriately shielded from any interference from the light of light box 6. Using the infrared detectors, a level of infrared energy emitted or reflected by sample particles dropping through region 5 can be detected and transferred to processor 9 for further processing. Temperature and moisture unit 106 also includes a conventional moisture meter such as the Micro-Moist LB 354 unit, which is conventionally available. This conventional unit uses microwave techniques, which causes rotation of unbound water molecules in particles of a sample dropping through region 5. The resulting phase shift serves as a direct measure of the moisture content of particles of the sample. Thus, the moisture content characteristics of the sample can be measured by temperature and moisture unit 106 and transferred to processor 9 for further processing. Once the temperature and moisture characteristics for the measured sample are obtained using temperature and moisture unit 106, the processor 9 retains these temperature and moisture characteristics for the measured sample. In the manner described above, the measured temperature and moisture characteristics are compared with the optimal characteristic definition 101 to determine if a deviation between the measured characteristics and the desired characteristics is present. If such a deviation between desired characteristics and measured characteristics exist, AVPM 100 accesses the corrective action database 103 to obtain a corrective action for eliminating the temperature and/or moisture deviation. As described above, AVPM 100 can transmit signals on line 132 of the control line network connected to various processing units of industrial process 50 to cause an increase or decrease in temperature and/or moisture content of subsequent measured samples. For example, AVPM 100 can cause a variation in the mix of raw materials provided from various raw material sources 110–114. Similarly, AVPM 100 can signal accumulator 116 to add or remove moisture from the accumulated material. AVPM 100 can also signal accumulator 116 to increase or decrease a level of heat or cooling applied to the accumulated raw materials. Thus, in various ways in a particular industrial process 50, AVPM 100 uses temperature and moisture characteristics of a measured sample to configure and control the operation of the industrial process.

Figure 4:
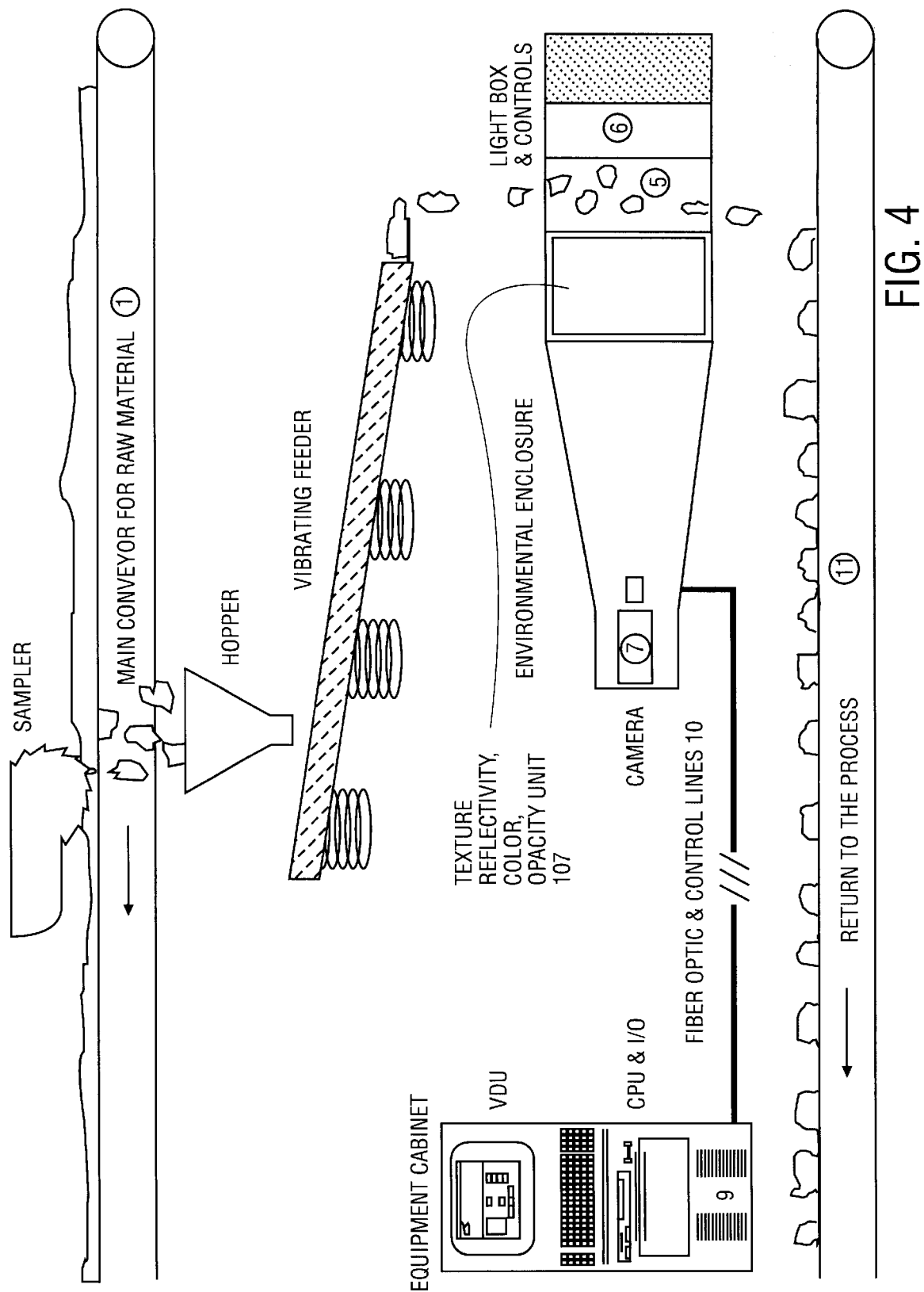
FIG. 4 illustrates an improved design for a particle parameter measurement system wherein texture, reflectivity, color, and opacity are measured.

The present invention can also measure the texture, reflectivity, color, and opacity characteristics of objects or materials traveling through an industrial process. These characteristics can then additionally be used to configure and control the operation of the industrial process. Referring to FIG. 4, an improved AVPM 100 is shown which includes, texture, reflectivity, color, and opacity unit 107. Unit 107 measures the texture, reflectivity, color, and opacity of particles of a measured sample passing through region 5. In one embodiment of the present invention, a conventional laser is used to illuminate particles of a sample passing through region 5. It will be apparent to one of ordinary skill in the art that the laser emitters are properly shielded from interference from the light of light box 6. Using the laser illumination of particles in region 5, estimates of texture, reflectivity, and opacity for particular sample particles can be made and transferred to processor 9. Additionally, unit 107 may include various color light sources for illuminating particles of the measured sample in various colors. Depending upon the reflectance characteristics of the color illuminated particles, estimates of color levels of the particles of a sample can be measured and transferred to processor 9. Similarly, camera 7 may be a conventional color camera to produce color images of sample particles falling through region 5. In this manner, the texture, reflectivity, color, and opacity characteristics of a measured sample can be captured and transferred to processor 9. Again using the technique described above, these characteristics of the measured sample can be compared against the optimal characteristic definition 101. Using the techniques described above, AVPM 100 can access the corrective action database 103 to determine a corrective action necessary in the industrial system to cause the texture, reflectivity, color, and opacity characteristics of the measured sample to conform to the optimal characteristic definition 101. For example, AVPM 100 can produce a signal on line 132 to cause a variation in the mix of raw material provided by raw material sources 110–114. This variation in raw material sources triggered by AVPM 100 can be used to configure the characteristics of the raw materials accumulated by accumulator 116. In this manner, raw materials with the desired texture, reflectivity, color, and opacity can be collected in accumulator 116 and provided to subsequent processing units of the industrial process 50.

Figure 5:
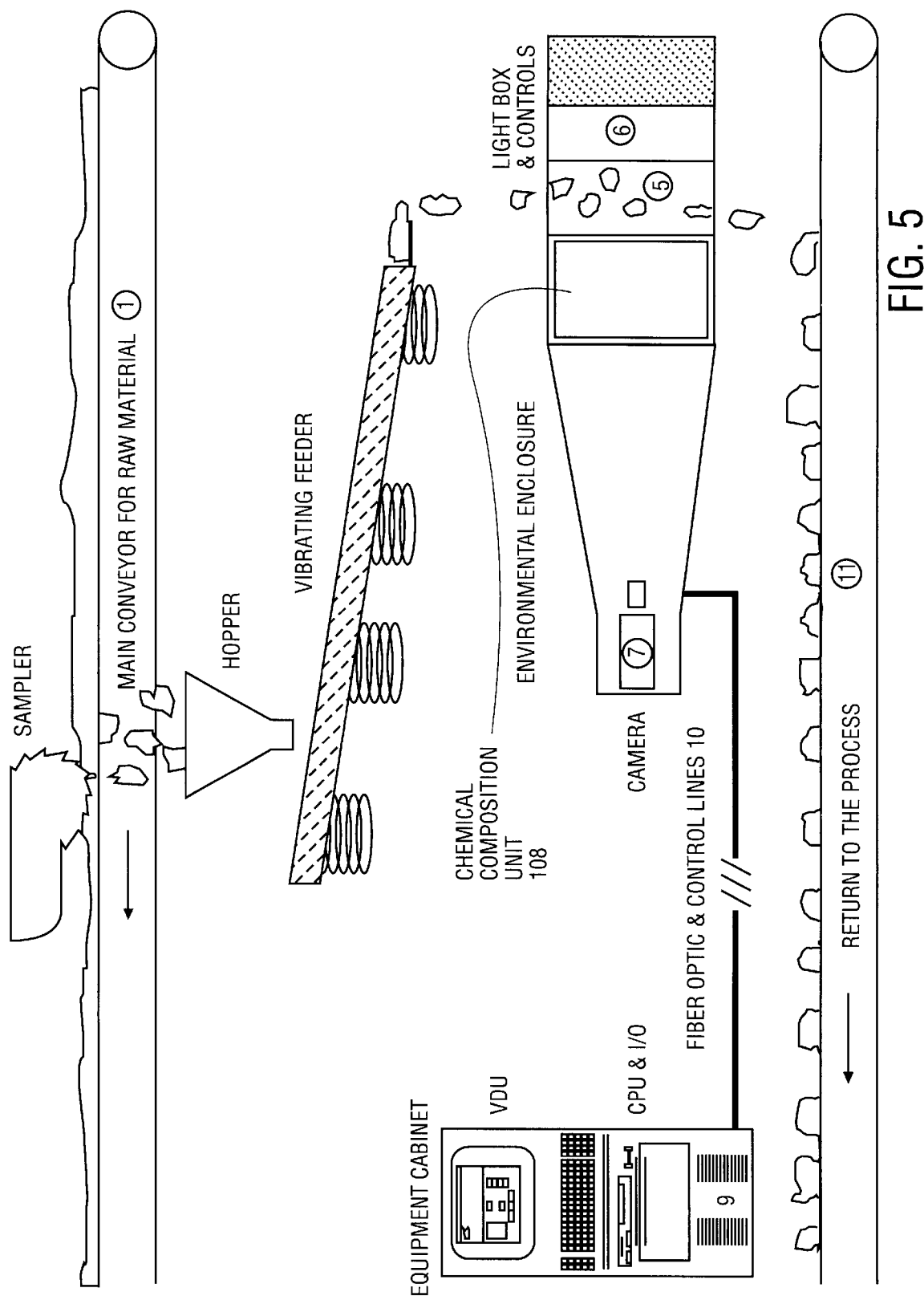
FIG. 5 illustrates an improved design for a particle parameter measurement system wherein chemical composition is measured.

The present invention also measures the chemical composition characteristics of objects or materials traveling through an industrial process. Referring to FIG. 5, an improved AVPM 100 is shown including a chemical composition unit 108. Unit 108 is used to measure the chemical composition of particles in the sample falling through region 5. Conventional techniques are known for measuring the chemical composition of materials in real-time. For example, one such real-time chemical composition measuring system is manufactured by Gamma-Metrics of Metrika, Inc. Such systems bombard particles of a sample with gamma rays and produce a reasonably accurate measurement of the elemental composition of the particles. These measured elemental composition characteristics of particles of the measured sample are obtained and transferred to processor 9. Thus, the improved AVPM 100 system illustrated in FIG. 5 is used to capture chemical composition characteristics for the measured sample. Again, using the technique described above, the chemical composition characteristics of the measured sample are compared against the optimal characteristic definition 101 to determine if there is a deviation. If so, AVPM 100 accesses the corrective action database 103 to configure and control processing units of industrial process 50 to reduce the deviation. For example, AVPM 100 can produce a signal on line 132 causing a variation in the output of raw material sources 110–114. Raw material sources 110–114 may initially be loaded with raw material having a range of chemical compositions. By adjusting the output provided by each of the raw material sources 110–114, AVPM 100 can control the chemical composition of the combined raw material collected in accumulator 116. Thus, AVPM 100 can control the chemical composition of objects or materials provided to subsequent processing units in industrial process 50. It will be apparent to one of ordinary skill in the art that additional characteristics of a measured sample may similarly be measured by a AVPM system and these characteristics used by AVPM 100 to configure and control the flow of material through a particular industrial process. AVPM 100 can also use additional information to control the industrial process 50. For example, AVPM 100 can use economic or business information such as unit cost information, demographics, or sales criteria to configure the objects or materials produced by finished processing unit 120. By sending a signal on line 132 and line 140 of the control line network, AVPM 100 can adjust the set quantity or configuration of finished products produced by finished processing unit 120. Again, AVPM 100 makes these adjustments based on a comparison between the economic or business information and the optimal characteristic definition 101. In this manner, the products produced by finished processing unit 120 will conform to a predefined set of economic or business criteria. It will be apparent to one of ordinary skill in the art that the additional information used by AVPM 100 may include information other than economic or business information. This other additional information may be used to configure a desired set of products in finished processing unit 120.

Thus, a control feedback system and method for industrial processes using automated particle or object analysis is disclosed. Although the present invention is described herein with reference to a specific preferred embodiment, many modifications and variations herein will readily occur to those with ordinary skill in the art. Accordingly, all such variations and modifications are included within the intended scope of the present invention as described by the following claims.

What is claimed is:

1. A process control system comprising:
    a particle characteristic measuring unit to obtain measured characteristics of a sample;
    an optimal characteristic definition for comparison with the measured characteristics;
    a corrective action database to define and select actions to be taken in response to a comparison of the measured characteristics with the optimal characteristic definition; and
    a control line network to transfer control signals to a plurality of processing units in response to a selected action to be taken.

2. The process control system as claimed in claim 1 wherein the particle characteristic measuring unit measures size and shape of particles in the sample.

3. The process control system as claimed in claim 1 wherein the particle characteristic measuring unit measures volume, weight, and density of particles in the sample.

4. The process control system as claimed in claim 1 wherein the particle characteristic measuring unit measures temperature of particles in the sample.

5. The process control system as claimed in claim 1 wherein the particle characteristic measuring unit measures moisture content of particles in the sample.

6. The process control system as claimed in claim 1 wherein the particle characteristic measuring unit measures texture, reflectivity, color, and opacity of particles in the sample.

7. The process control system as claimed in claim 1 wherein the particle characteristic measuring unit measures chemical composition of particles in the sample.

8. The process control system as claimed in claim 1 wherein the particle characteristic measuring unit further includes a sampling device for diverting a pre-selected amount of particulate material from a conveyor.

9. The process control system as claimed in claim 1 wherein the particle characteristic measuring unit further includes a feeder to separate particles of the sample into an approximate monolayer.

10. The process control system as claimed in claim 1 wherein the optimal characteristic definition includes a definition of a desired size and shape of particles in the sample.

11. The process control system as claimed in claim 1 wherein the optimal characteristic definition includes a definition of a desired volume, weight, and density of particles in the sample.

12. The process control system as claimed in claim 1 wherein the optimal characteristic definition includes a definition of a desired temperature of particles in the sample.

13. The process control system as claimed in claim 1 wherein the optimal characteristic definition includes a definition of a desired moisture content of particles in the sample.

14. The process control system as claimed in claim 1 wherein the optimal characteristic definition includes a definition of a desired texture, reflectivity, color, and opacity of particles in the sample.

15. The process control system as claimed in claim 1 wherein the optimal characteristic definition includes a definition of a desired chemical composition of particles in the sample.

16. The process control system as claimed in claim 1 wherein the corrective action database includes control information for generating control signals to control or configure one or more processing units of the plurality of processing units based on a comparison of the measured characteristics with the optimal characteristic definition.

17. The process control system as claimed in claim 1 wherein the corrective action database includes control information for generating control signals to control or configure a crusher based on a comparison of the measured characteristics with the optimal characteristic definition.

18. The process control system as claimed in claim 1 wherein the corrective action database includes control information for generating control signals to control or configure a raw material source based on a comparison of the measured characteristics with the optimal characteristic definition.

19. The process control system as claimed in claim 1 wherein the corrective action database includes control information for generating control signals to control or configure an accumulator based on a comparison of the measured characteristics with the optimal characteristic definition.

20. The process control system as claimed in claim 1 wherein the corrective action database includes control information for generating control signals to control or configure a finish processing unit based on a comparison of the measured characteristics with the optimal characteristic definition.

* * * * *